United States Patent
Layne et al.

(10) Patent No.: US 6,364,095 B1
(45) Date of Patent: Apr. 2, 2002

(54) MODULAR CONVEYOR SYSTEM WITH SIDE FLEXING BELT HAVING ROLLER SUPPORT

(75) Inventors: James L. Layne, Bowling Green; Michael D. McDaniel; Mark T. Johnson, both of Glasgow; Wendell S. Bell, Smiths Grove, all of KY (US)

(73) Assignee: Span Tech LLC, Glasgow, KY (US)

( * ) Notice: Subject to any disclaimer, the term of this patent is extended or adjusted under 35 U.S.C. 154(b) by 0 days.

(21) Appl. No.: 09/548,160

(22) Filed: Apr. 13, 2000

(51) Int. Cl.$^7$ ............................................. B65G 17/06
(52) U.S. Cl. ...................................... 198/852; 198/853
(58) Field of Search ................................. 198/852, 853, 198/845, 838

(56) References Cited

U.S. PATENT DOCUMENTS

| | | |
|---|---|---|
| 3,550,756 A | 12/1970 | Kornylak |
| 3,575,282 A | 4/1971 | Gaiotto |
| 3,880,276 A | 4/1975 | Willett, III |
| 4,231,469 A | 11/1980 | Arscott |
| D299,424 S | 1/1989 | Schroeder et al. |
| D299,425 S | 1/1989 | Schroeder et al. |
| 4,821,869 A | 4/1989 | Hodlewsky |
| 4,852,722 A | 8/1989 | Houseman |
| 4,880,107 A | 11/1989 | Deal |
| 4,909,380 A | 3/1990 | Hodlewsky |
| 4,953,693 A | 9/1990 | Draebel |
| 4,993,540 A | 2/1991 | van Capelleveen |
| 5,031,757 A | 7/1991 | Draebel et al. |
| 5,076,422 A | 12/1991 | Clopton |
| 5,096,050 A | 3/1992 | Hodlewsky |
| 5,224,583 A * | 7/1993 | Palmaer et al. ............. 198/779 |
| 5,238,099 A | 8/1993 | Schroeder et al. |
| 5,261,525 A | 11/1993 | Garbagnati |
| 5,307,923 A * | 5/1994 | Damkjaer .................... 198/852 |
| 5,330,045 A | 7/1994 | Hodlewsky |
| 5,404,997 A | 4/1995 | Schreier et al. |
| 5,573,105 A * | 11/1996 | Palmaer ....................... 198/853 |
| 5,706,934 A | 1/1998 | Palmaer et al. |
| 5,775,480 A * | 7/1998 | Lapeyre et al. ............. 198/831 |
| 5,797,820 A * | 8/1998 | Endo .......................... 474/230 |
| 5,806,653 A * | 9/1998 | Ahls et al. ................... 198/326 |
| 6,209,716 B1 * | 11/1998 | Bogle et al. ................. 198/852 |
| 5,909,797 A * | 6/1999 | Van Den Goor ....... 198/370.02 |
| 5,911,306 A | 6/1999 | Ferrari |
| 6,241,082 B1 * | 6/1999 | Vanmeenen et al. ......... 198/845 |
| 6,070,711 A * | 6/2000 | Murano et al. ............. 198/779 |
| 6,079,552 A * | 6/2000 | Reichert et al. ............ 198/852 |
| 6,209,714 B1 * | 7/2000 | Lapeyre et al. ............. 198/779 |
| 6,253,911 B1 * | 8/2000 | Layne et al. ................. 198/852 |
| 6,148,990 A | 11/2000 | Lapeyre et al. |

* cited by examiner

*Primary Examiner*—Donald P. Walsh
*Assistant Examiner*—Rashmi Sharma
(74) *Attorney, Agent, or Firm*—King and Schickli PLLC

(57) ABSTRACT

A modular link conveyor system for transporting articles is provided having a plurality of modular link sections providing a support surface for the articles and wherein one or more rollers are positioned in the underside of selected link sections to provide support by rolling on a guide rail of the conveyor system. Each link section includes at least one interengaging apex and leg portion having a matching hole and slot for receiving a transverse rod to permit side flexing action. An enclosure for each roller provides protective encapsulation along at least the two sides and substantially around 180° of the rolling face to prevent debris build up. Advantageously, a roller is mounted in each side link section that also provides a depending arm and transverse tab for lateral guiding action. The link sections are combined to form a composite link and a cover plate provides an extended support surface.

16 Claims, 2 Drawing Sheets

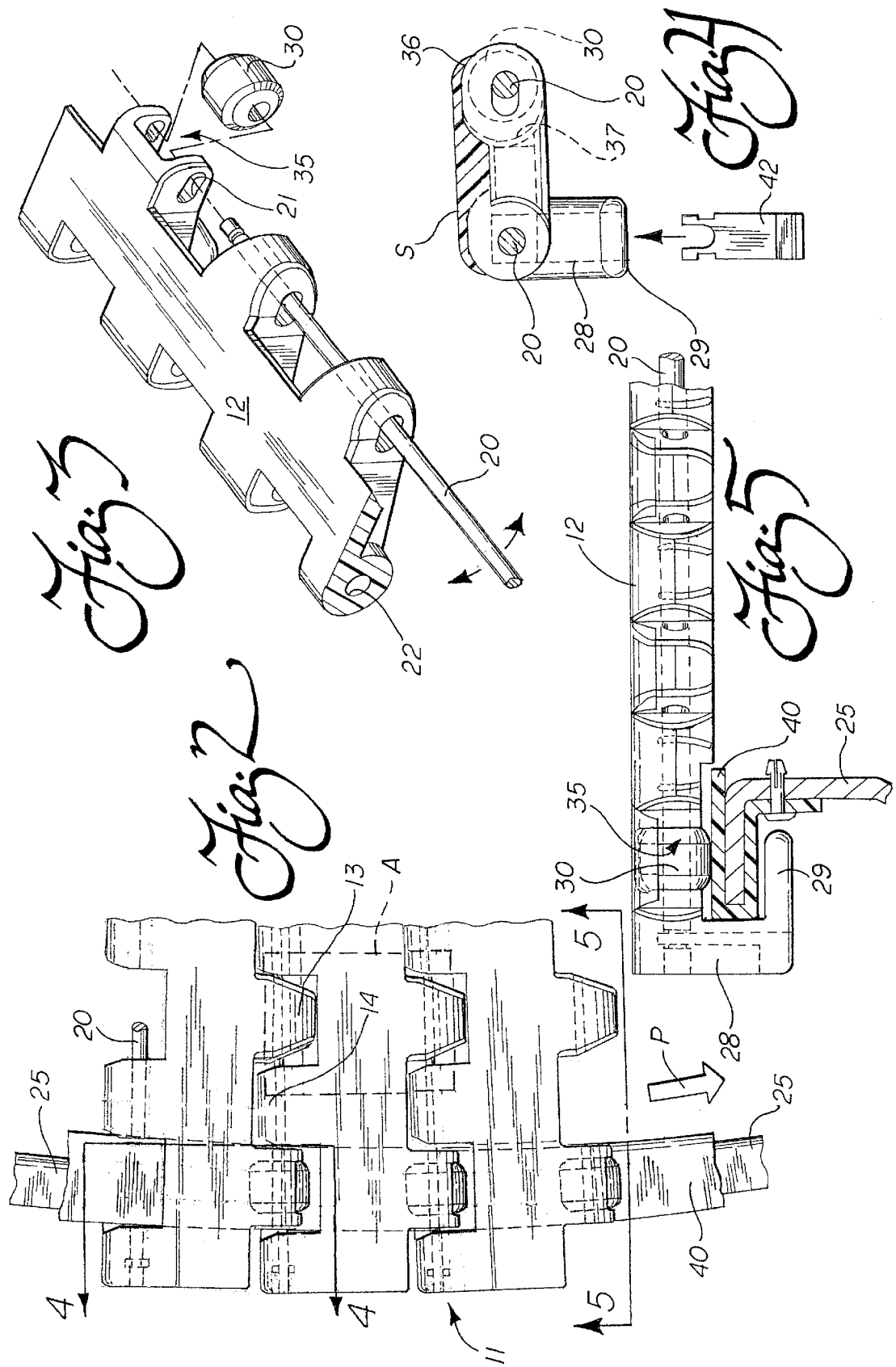

MODULAR CONVEYOR SYSTEM WITH SIDE FLEXING BELT HAVING ROLLER SUPPORT

TECHNICAL FIELD

The present invention relates to modular link conveyor systems, and more particularly to such a conveyor system providing a side flexing belt with roller support as a part of the belt.

BACKGROUND OF THE INVENTION

The use of side flexing modular link conveyors in the food processing industry enjoys increasing popularity. Particularly for conveying food articles or products, especially in packages or in semi-packaged form, the modular link conveyor represents the overwhelming choice of food processors. In the recent past, there have been significant advances in the development of such have been significant advances in the development of such conveyors so as to provide more efficient handling of an even larger variety of food articles, packages and containers, as well as other types of articles and products.

One of the most popular types of modular link conveyor systems on the market today, if not the most popular, is The Designer System, manufactured and sold by the assignee of the present invention, and illustrated and claimed in prior U.S. Pat. No. 4,953,693, Sep. 4, 1990 and U.S. Pat. No. 5,031,757, issued Jul. 16, 1991. Since the time of these early patents in the art, the significant advances have been fast in coming to provide an even more efficient operation and better handling and transporting of articles and products.

One such advance is the provision of side mounted rollers for smoothly guiding the side flexing conveyor belt around curves, such as illustrated and claimed in co-pending application Ser. No. 09/131,587, filed Aug. 10, 1998 entitled "External Guide Assembly for Reducing Conveyor Belt Drag" and assigned to the assignee of the present invention. Specifically, stationary mounted spindles with idler rollers adjacent the curves have proven to be highly effective in reducing the side drag along the path. This advantageously serves to somewhat reduce the driving power requirements, as well as the modular link wear attributed to the lateral forces. Others have proposed providing openly mounted rollers carried on the modular links themselves, and acting against the inside of an upstanding rail in an attempt to accomplish the same result, as illustrated in U.S. Pat. No. 5,775,480, issued Jul. 7, 1998.

There also exists in the prior art relating to chain conveyors, the provision for rollers for supporting the chain, as well as for lateral guiding action. Each chain link mounts the rollers in the open, and upper and lower guide tracks are provided, as set forth for example in a U.S. Patent to Clopton U.S. Pat. No. 5,076,422, issued Dec. 31, 1991. A similar, but much earlier arrangement providing both support and lateral guiding of a conveyor chain is shown in the Gaiotto et al. U.S. Pat. No. 3,575,282 issued Apr. 20, 1971.

Thus, while support/guide rollers mounted on chain conveyors have been successfully tried for almost two decades, there is a need identified for providing a successful arrangement for support rollers mounted on the conveyor belt in a modular link conveyor system. So far, such a solution has escaped those working in the conveyor technology. If such an advance in modular conveyors is to take place, it must compliment the effective guiding action achieved by the side rollers mounted along the guide rails, and thereby enhance the overall operation of the conveyor system.

SUMMARY OF THE INVENTION

Accordingly, it is an objective of the present invention to provide substantially friction free support for a modular link conveyor system, and thus provide the advance in the prior art systems that has so far eluded others.

It is another object of the present invention to so provide an enhancement to a modular link conveyor belt by the provision of support rollers mounted on the belt structure.

It is still another object of the present invention to provide a modular link conveyor system, a conveyor belt and a link section, wherein support roller(s) is on the underside of the link section of the conveyor belt and mounted in an enclosure to minimize debris build up.

Another object of the present invention is to provide a modular link conveyor system having a belt/link section with support roller(s) that is highly effective to reduce friction and thereby minimize power driving requirements and to substantially eliminate link wear.

Additional objects, advantages, and other novel features of the invention will be set forth in part in the description that follows and in part will become apparent to those skilled in the art upon examination of the following or may be learned with the practice of the invention. The objects and advantages of the invention may be realized and attained by means of the instrumentalities and combinations particularly pointed out in the appended claims.

Accordingly, to achieve the foregoing and other objects, and in accordance with the purposes of the present invention as described herein, an improved modular link conveyor system and a side flexing belt for transporting articles along a longitudinal path is provided. The belt has a plurality of modular link sections that extend in both the longitudinal and transverse directions, each unique link section including interengaging apex and leg portions. A transverse connector extends through matching apertures to provide the side flexing action. An extended support surface for the transported articles is provided on the upper side of the links. At least one, but preferably multiple, spaced support rollers are provided. Each roller is mounted in an enclosure on the underside of a corresponding link section. It is aligned and specially adapted for rolling on a longitudinally extending rail. The rail gives a very efficient support arrangement for the weight of the conveyor belt and transported articles. As a result, smooth, substantially friction free support of the belt is obtained, even when the number and weight of the articles being handled is significantly increased. This enhancement also advantageously serves to both minimize the power driving requirements and significantly reduce the wear on the link sections.

Because each roller is mounted in an enclosure on the underside of the link section, debris build up around the roller, such as inadvertent spillage from transported food products, is minimized. The enclosure in accordance with the preferred embodiment extends in close proximity to the two sides of the roller and along at least the upper roller face. For the greatest effectiveness, the enclosure forms a curved cap having a lip and depending skirt covering substantially 180° of the rolling face of the roller.

The top of the rail is provided with a support strip fabricated of plastic to provide a smooth track surface for the support roller to roll on. Preferably, the modular link sections of the conveyor belt are molded of low cost, polypropylene plastic, whereas the roller and this support strip are formed of high strength, wear resistant plastic, such as acetyl or Nylon.

In accordance with the preferred embodiment disclosed for illustrative purposes, a support roller is mounted in each side link section. A depending arm and transverse tab are provided on each of these sections to engage the side and lower faces of the strip so as to double for providing lateral guiding action of the belt. In accordance with the preferred embodiment, there are at least two side by side, integral modular link sections forming a composite link, which in turn establishes an extended upper support surface for the articles being transported. As a result, smaller items, such as bottle caps, are particularly adapted for transporting on the conveyor system. The extra smooth operation generated by the roller support feature, that thus eliminates any tendency for the support surface to vibrate and cause such small articles to move on the surface, adds to the desirability of the conveyor system of the present invention.

The transverse connector to form the belt is preferably a plastic or metal rod that extends through a slot in the apex portion and a hole in the leg portion, which allows the side flexing action. Lock elements carried by the side link sections couple the rod to the belt.

Still other objects of the present invention will become readily apparent to those skilled in this art from the following description wherein there is shown and described a preferred embodiment of this invention, simply by way of illustration of one of the modes best suited to carry out the invention. As it will be realized, the invention is capable of other different embodiments, and its several details are capable of modifications in various, obvious aspects all without departing from the invention. Accordingly, the drawings and descriptions will be regarded as illustrative in nature and not as restrictive.

BRIEF DESCRIPTION OF THE DRAWINGS

The accompanying drawings incorporated in and forming a part of the specification, illustrate several aspects of the present invention, and together with the description serve to explain the principles of the invention. In the drawings:

FIG. 2 is a partial top view showing the manner in which the link sections with support rollers riding on a support rail allows side flexing action and promoting a particularly smooth operation;

FIG. 3 is an exploded perspective view of a cut-away composite link illustrating the mounting of the roller in the enclosure of the side link section by the transverse rod;

FIG. 4 is a cross sectional view taken along line 4—4 of FIG. 2 and illustrating the lock element for the transverse rod in a position to be installed; and FIG. 5 is a partial front view of the composite link and including a cross sectional view through the support rail and strip mounted on the support rail of the frame of the conveyor system.

Figure 1:
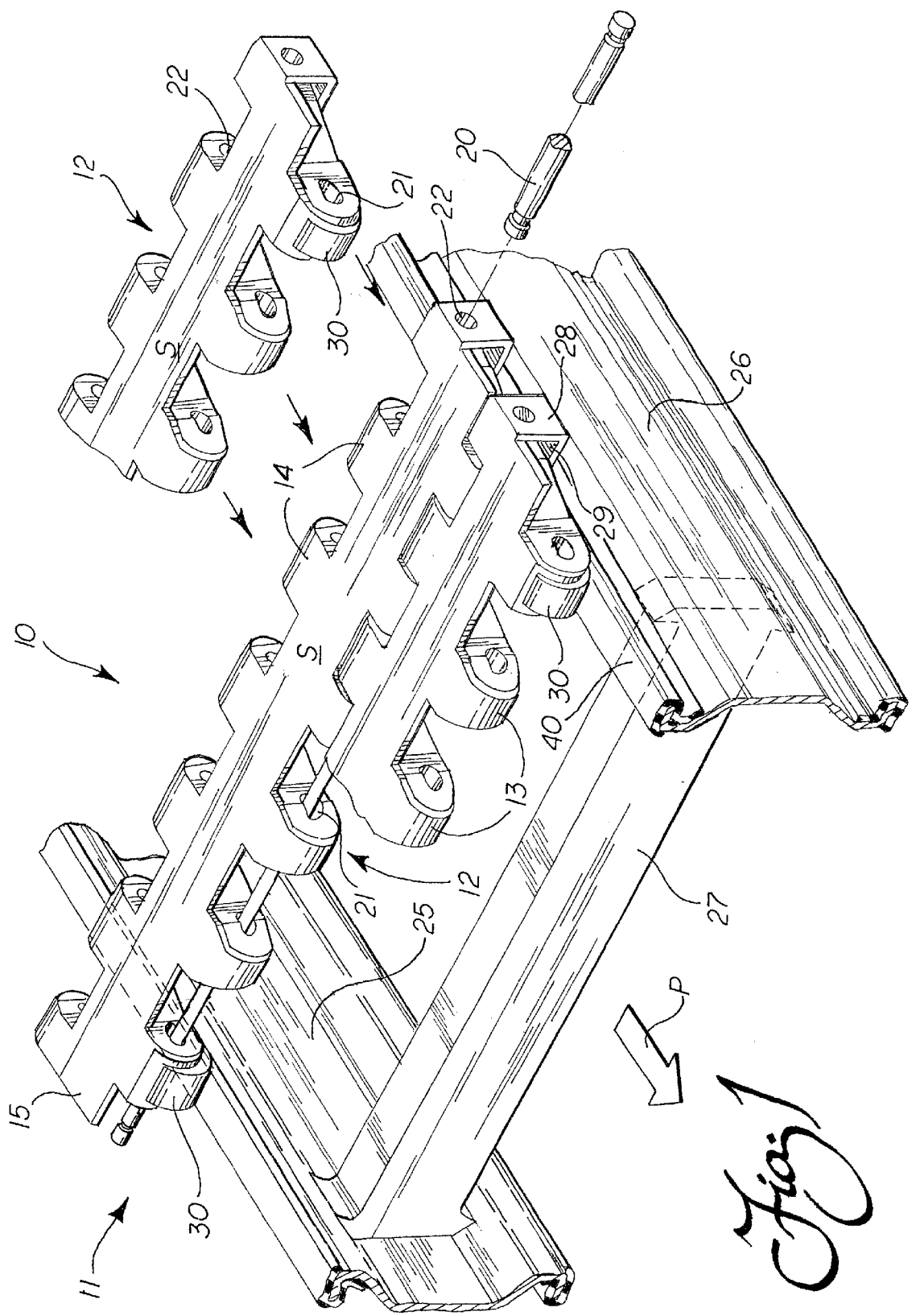
FIG. 1 is an exploded perspective view illustrating a conveyor belt having link sections with mounted rollers for movement in a longitudinal direction along side support rails and thus forming the modular link conveyor system of the present invention.

Reference will now be made in detail to the present preferred embodiment of the invention, an example of which is illustrated in the accompanying drawings.

DETAILED DESCRIPTION OF THE PREFERRED EMBODIMENT

In the overall schematic illustration of FIG. 1, there is illustrated the basic components of a modular link conveyor system constructed in accordance with the principles of the present invention. A belt 11 is made up of interconnected composite links 12. A partial composite link 12 is shown in exploded view to reveal additional detail. A plurality of modular link sections within the composite link 12 comprises interengaging apex portions 13 and leg portions 14. It will be recognized that the basic structure of the composite links 12 is similar to the links set forth in my two basic patents, U.S. Pat. Nos. 4,953,693 and 5,031,757, the disclosures of which are incorporated herein by reference. While the composite links 12 illustrated in FIG. 1 include four inside modular link sections and two side link sections, it is to be understood that any number of sections can be utilized depending primarily on the width of the conveyor desired. Also, while the link sections of the composite link 12 are integrally connected to each other in the illustrated preferred embodiment, it is to be understood that the link sections can be separate, but integrally connected, as used in the belts shown in my previous patents. The only requirement is that the link sections be interengaged at the apex and leg portions 13, 14 so as to be capable of forming the conveyor belt 11. An extended support surface S is formed across the top of each composite link 12. As shown in FIGS. 1 and 2, the usual gaps associated with modular links are eliminated, so that small articles can be transported.

Each of the interengaging apex and leg portions 13, 14 are connected by a transverse connector 20. As will be apparent, there are matching apertures; namely, a slot 21 and hole 22 are provided in each of the apex portions 13 and the leg portions 14, respectively. As illustrated in FIG. 1, the transverse connector 20 is in the form of a rod. It can either be plastic or metal, and is inserted from one end in the manner indicated, after each pair of the composite links are assembled, all as indicated by the action arrows in FIG. 1.

As best illustrated in FIG. 2, because of the relationship of the slot 21, the hole 22 and the rod 20, the belt 11 is capable of limited side flexing action. Thus, even if the conveyor system 10 is intended for essentially straight conveying movement, slight misalignments along the longitudinal path can be easily accommodated.

The conveyor system 10 also includes a pair of side support rails 25, 26, which along with the cross bar 27 form a part of the frame of the system 10. As illustrated, the support rails 25, 26 are parallel and extend longitudinally along a path P intended for transporting the articles. In this regard, note the depiction of an article A, illustrated by dashed line outline, in FIG. 2. The side link sections include a depending arm 28 and inwardly extending lip 29 to provide for lateral guidance along the path P.

In accordance with an important aspect of the present invention, at least one support roller 30 is provided in the underside of selected link section(s). The rollers 30 in the preferred embodiment are in the side link sections aligned with the corresponding side rails 25 or 26. They are rotatably mounted by the transverse connector rod 20 so as to be adapted to roll on the top surface of the rails. As will be realized, with this arrangement, the rollers 30 effectively support the weight of the conveyor belt 11, as well as the weight of the articles A on the belt. The rollers 30 thus provide a smooth, substantially friction free conveying movement along the feed path P. This particular arrangement minimizes power driving requirements and link wear. Furthermore, the positioning of the roller 30 in the side link section and underneath the extended support surface S is effective to protect the roller from inadvertent spillage, and thus prevent debris build up and potential conveyor jams, as has been a problem in the past.

With reference now more specifically to FIG. 3, each roller 30 is actually mounted by the connector rod 20 in an enclosure, generally designated by the reference numeral 35 (also see FIG. 5). In accordance with the preferred arrangement, the two sides of the roller 30, as well as the upper roller face, are mounted in close proximity to the inside walls of the enclosure 35. As best illustrated in FIG. 4, the enclosure includes a curved cap including a lip 36 as an extension of the support surface S. Also, a curved skirt 37 extends behind the roller 30 to complete the protective encapsulation. Indeed, the curved cap formed by the lip 36 and the skirt 37 covers substantially 180° of the rolling face of the roller. As a result, any spilled food product is deflected away and minimal contamination results, thus reducing the normal cleaning requirements at the end of each operation shift.

To provide a smooth surface upon which the roller 30 is engaged, there is provided a support strip 40 on top of each of the guide rails 25, 26 (see in particular FIG. 5). The roller 30 and the support strip 40 are preferably molded of high strength, wear resistant plastic, such as acetyl, Nylon or their equivalent. On the other hand, the composite link 12 may be molded from low cost, polypropylene plastic, or its equivalent. This combination provides a more efficient overall conveyor system 10 in terms of cost, as well as in superior performance.

As illustrated in FIG. 4, the rod 20 has a notch on each end to receive lock element 42. The depending arm 28 and the lip 29 of the end link section is guided in the lateral direction by engaging the side and bottom faces formed by the strip 40, as illustrated in FIG. 5. As mentioned above, the main function of the support strip 40 is to form a track for each of the rollers 30, to thus assure the desired low friction and virtually vibration free conveying movement is attained.

The present invention also includes the modular link conveyor belt 11 per se, as well as the modular link section per se including the support rollers 30. In each instance, the features described above provide the same desirable functionality and advantages.

In summary, the modular link conveyor system 10, the conveyor belt 11 and the modular link section of the present invention bring about superior results and advantages not previously realized. The rollers 30 are positioned in the underside of the corresponding side link sections and provide friction free, smooth rolling action on the support rails 25, 26. The full weight of the belt 11, as well as the articles A, are supported. The belt 11 of the invention is particularly useful where the support surface S on the upper side is fully extended as illustrated. As a result, even small articles A, such as bottle caps can be successfully transported. On the other hand, because of the friction free movement, the versatility of the conveyor system 10 is enhanced and lends itself to conveying even heavier than normal articles A. The transverse connector rod is utilized to accommodate side flexing and to rotatably mount the roller 30 in each side link section. The enclosure 35 for the roller 30 provides full protective encapsulation, and thus maximum protection against debris build-up.

The foregoing description of the preferred embodiment of the invention has been presented for purposes of illustration and description. It is not intended to be exhaustive or to limit the invention to the precise form disclosed. Obvious modifications or variations are possible in light of the above teachings. The embodiment was chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally and equitably entitled.

What is claimed is:

1. A modular link conveyor system having a belt for transporting articles along a longitudinal path comprising:
    a plurality of modular link sections extending in both longitudinal and transverse directions having interengaging apex and leg portions;
    at least one apex and leg portion of said link sections being connected by a transverse connector extending through matching apertures;
    a support surface of said belt on the upperside of said link sections;
    at least one support rail extending longitudinally along said path and aligned with at least one link section; and
    a support roller in the underside of said one link section and rotatably mounted for rolling on said rail to support the weight of the belt and the articles,
    whereby said roller provides smooth, substantially friction free support for enhancing conveying movement along said path to minimize power driving requirements, debris build-up and link wear.

2. The conveyor system of claim 1, wherein said roller is in an enclosure that extends in close proximity to at least the two sides and along at least the upper roller face.

3. The conveyor system of claim 2, wherein said enclosure forms a curved cap having a lip and skirt covering substantially 180° of the rolling face of the roller.

4. The conveyor system of claim 3, wherein a strip is provided along the top of said rail to provide a track for said support roller.

5. The conveyor system of claim 4, wherein said modular link sections are molded of low cost, polypropylene plastic, and said roller and said strip are formed of high strength, wear resistant plastic.

6. The conveyor system of claim 1, wherein said support roller is mounted in a side link section having a depending arm and transverse tab for engaging the side and lower faces of said strip, respectively, for also providing lateral guiding action of said belt.

7. The conveyor system of claim 1, wherein said plurality of modular link sections include at least two side-by-side link sections that are integral with each other to form a composite link.

8. The conveyor system of claim 7, wherein is provided a cover plate over said composite link to provide an extended support surface for the articles being transported.

9. The conveyor system of claim 6, wherein said matching apertures include a transverse slot in said apex portion and a transverse hole in said leg portion.

10. The conveyor system of claim 9, wherein said transverse connector is a rod extending through said slot and said hole and substantially across the full width of said belt to allow side flexing action, and lock elements carried by said side link sections connected to the ends of said rod for retention.

11. The conveyor system of claim 6, wherein is provided a support roller mounted in each side link section of the belt.

12. A modular link conveyor belt adapted to engage a support surface for transporting articles along a longitudinal path comprising:

a plurality of modular link sections extending in both longitudinal and transverse directions having interengaging apex and leg portions;

at least one apex and leg portion of said link sections being connected by a transverse connector extending through matching apertures; and a support roller in the underside of at least one link section and rotatably mounted for rolling on said support surface to support the weight of the belt and the articles, whereby said roller provides smooth, substantially friction free support for enhancing conveying movement along said path to minimize power driving requirements, debris build-up and link wear.

13. The conveyor belt of claim 12, wherein said roller is in an enclosure that extends in close proximity to at least the two sides and along at least the upper roller face.

14. The conveyor belt of claim 13, wherein said enclosure forms a curved cap having a lip and skirt covering substantially 180° of the rolling face of the roller.

15. The conveyor belt of claim 12, wherein said support roller is mounted in a side link section having a depending arm and transverse tab for providing lateral guiding action of said belt.

16. The conveyor belt of claim 15, wherein is provided a support roller mounted in each side link section of the belt.

* * * * *